Nov. 26, 1940.  A. ABRAMS ET AL  2,223,017
TAMPERPROOF SEAL AND METHOD OF MAKING SAME
Filed July 10, 1937  2 Sheets-Sheet 1
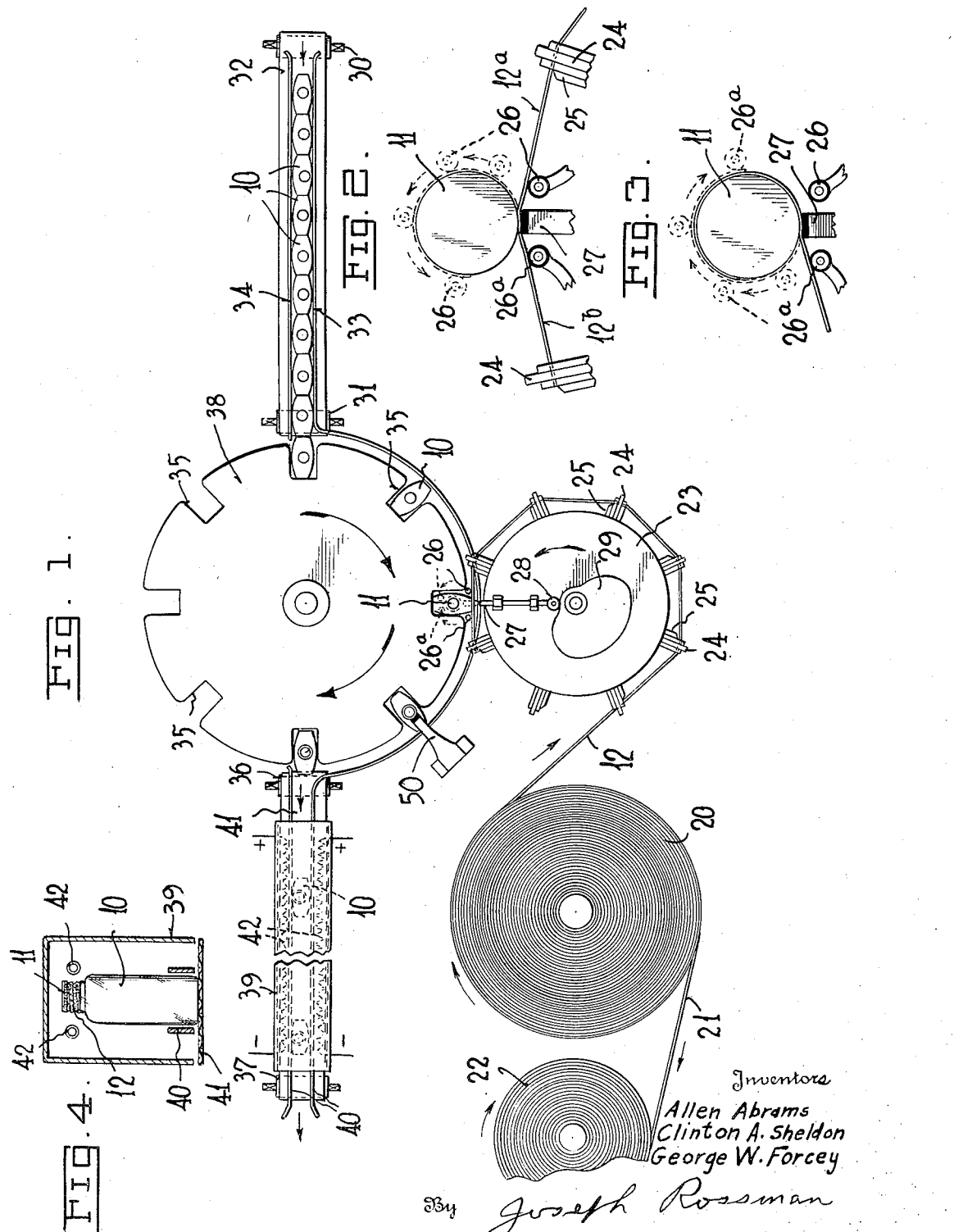
Inventors
Allen Abrams
Clinton A. Sheldon
George W. Forcey
By Joseph Rossman
Attorney Nov. 26, 1940.   A. ABRAMS ET AL   2,223,017
TAMPERPROOF SEAL AND METHOD OF MAKING SAME
Filed July 10, 1937   2 Sheets—Sheet 2
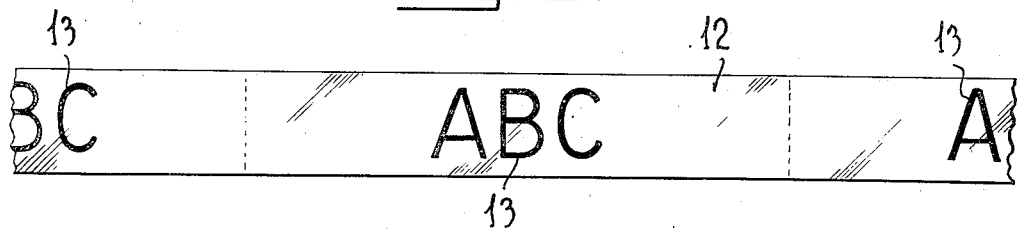
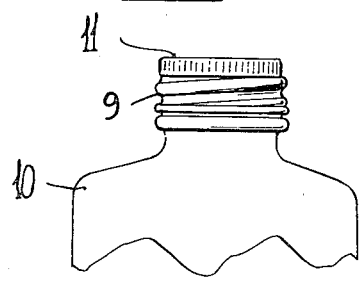 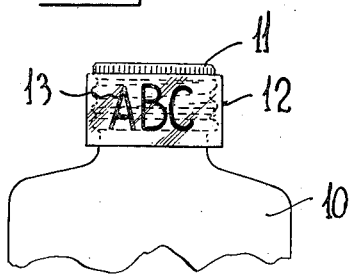
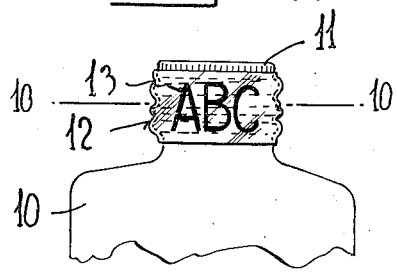 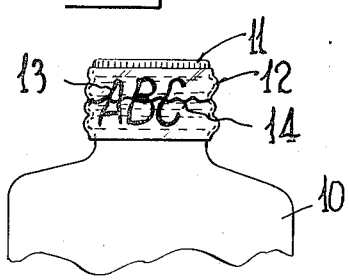
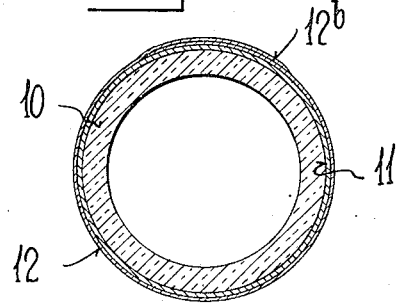
Inventors
Allen Abrams
Clinton A. Sheldon
George W. Forcey
By Joseph Rossman
Attorney Patented Nov. 26, 1940

2,223,017

UNITED STATES PATENT OFFICE 2,223,017

TAMPERPROOF SEAL AND METHOD OF MAKING SAME

Allen Abrams and George W. Forcey, Wausau, Wis., and Clinton A. Sheldon, Bronxville, N. Y., assignors to Marathon Paper Mills Company, Rothschild, Wis., a corporation of Wisconsin Application July 10, 1937, Serial No. 153,070

2 Claims. (Cl. 226—80)

This invention relates to a tamperproof seal for container closures.

Numerous proposals have hitherto been made for sealing the closures of containers so as to make them tamperproof, but a cheap, easily applied seal has not yet been developed which will meet with commercial requirements.

According to this invention a seal is provided for container closures which can be quickly and easily applied by automatic mechanism so that a large number of containers can be sealed in rapid succession.

Further details and advantages of the invention will be apparent from the annexed drawings and the following specification.

On the drawings:

Figure 1 is a diagrammatic plan view of an apparatus for sealing container closures.

Figure 2 is an enlarged detail view showing the first stage in applying the sealing tape.

Figure 3 is an enlarged detail view showing a later stage of the sealing tape as it is being applied to the closure.

Figure 4 is a sectional view of the heating tunnel for shrinking the applied sealing tape.

Figure 5 is a plan view of a portion of the sealing tape having indicia printed thereon.

Figure 6 is a fragmentary perspective view of a container having a closure thereon.

Figure 7 is a fragmentary view of the container shown in Figure 6 with the sealing strip wrapped around the closure.

Figure 8 is a fragmentary view of the container shown in Figure 7 with the seal heat-shrunk so as to form a tamperproof seal.

Figure 9 is a perspective view of the container shown in Figure 8 with the seal broken.

Figure 10 is an enlarged sectional view taken on lines 10—10 of Figure 8.

Referring to the drawings, Figure 5 illustrates a portion of the tape 12 used for sealing the container closure. The tape 12 is provided with indicia 13 produced by printing, embossing or other suitable manner. The tape is advantageously made of a wax-rubber composition in accordance with U. S. patent to Abrams et al. 2,054,112, September 15, 1936. A tape made of a composition comprising 15% to 40% rubber and the remainder of paraffin wax provides a satisfactory seal for closures. Suitable antioxidants to prevent deterioration of the rubber may be added. Any desired pigments may also be added as disclosed in aforementioned patent. The sealing tape may also be made in accordance with U. S. Patent No. 2,054,115, September 15, 1936.

Another tape suitable for the purpose of this invention can be made from rubber hydrohalide produced in accordance with the Calvert Patent No. 1,989,632. If desired, pigments may be added to this tape for producing ornamental effects when the container is sealed therewith.

Tapes made of gutta percha may also be advantageously used. Generally, any thermoplastic composition or substance which can be given the form of a tape is suitable for our invention, as one of the important requisites is that the tape, after being applied to the closure joint, softens sufficiently when subjected to heat to form a seal which cannot be removed except by breaking or distorting same.

Some thermoplastic tapes such as those made of wax-rubber compositions have the additional property of shrinking considerably under the influence of heat. Such tapes are especially suitable for sealing container closures 11 having an irregular contour as shown at 9 in Figure 6 due to the threads for screwing same on a bottle 10. The tape 12 is wrapped about the closure as shown in Figure 7 so as to overlie the joint of the closure 11 with the container 10. The tape 12 is of such width as to overlie a portion of the closure 11 and the container 10 in the region of the joint. The closure with the tape wrapped about it is then subjected to sufficient heat to cause the tape to seal or weld to itself as at 12b in Figure 10, and also to shrink thereby tightly clinging and conforming to the contour of the closure and container as shown in Figure 8.

As previously stated, the tape may be printed with indicia 13 which serves to indicate whether the closure has been tampered with or removed on account of the distortion of the film produced by twisting or removing the closure. The letters or other indicia 13 will become distorted as shown in Figure 9. The tape will also rupture as illustrated at 14 in Figure 9 when the closure is removed because the tape adheres to the closure as well as to the container so that it is impossible to open the container without leaving tell-tale results on the seal. After being heat shrunk it is therefore very difficult to remove the tape and to replace it without revealing that it has been tampered with.

The tape may be applied by hand if desired, but it is preferred to apply it by automatic mechanism as illustrated in Figure 1 which is particularly adapted for sealing closures with a wax-rubber tape. The tape 12 is supplied from a roll 20 which may be interwound with paper web 21. The paper web 21 may be wound up on roll 22 as the tape is fed to the clamps 24 carried on a turret 23 rotating in the direction of the arrow. The clamps engage the tape and convey it to the wrapping station intermediate the rotating turret 23 and turret 30 carrying the containers. When the tape reaches the wrapping station a knife 25 cuts off the length of tape held between clamps 24. Cam 29 then actuates link 27 through follower 28 so as to yieldingly press the tape against the container closure as shown in Figure 2. The end of link 27 is rubber cushioned so as to yieldingly press the tape and cause it to conform to the closure and container. Roll 26 then wraps one end of the tape about the closure as shown by the dotted line in Figure 2, and is retracted. Roll 26a then applies the other end of the tape about the closure as shown in dotted line in Figure 3. Rolls 26 and 26a are preferably rubber covered to assist in conforming the tape to the contour at the joint region.

The container 10 is then carried to the next station where a tool 50, preferably automatically actuated by suitable linkage to the drive mechanism, applies pressure to the overlapped portion 12b of the tape shown in Figure 10. The tool 50 is preferably rubber cushioned so as to yieldingly conform the tape to the container and closure contour. Container 10 is then carried to the next station where it is delivered to the conveyor 41.

The containers 10 are fed to the turret 38 by a belt conveyor 32 carried about rolls 30 and 31. The containers are guided by rails 33 and 34. The individual containers are fed into the receiving slots 35 of the turret 38 and then carried on to the tape applying stations, previously described, from whence they are carried to the belt conveyor 41 which passes through a tunnel 39. The conveyor passes over rolls 36 and 37. The containers are guided by side bars 40 while they travel on the belt. Electrically heated elements 42 are positioned lengthwise of the tunnel 39 adjacent the closure. The heat generated in the tunnel is regulated so as to heat seal or shrink the wrapped tape into the condition as shown in Figure 8. When using a wax-rubber tape having 15 to 40% rubber it is advantageous to produce a temperature of about 150° F. in the film for shrinking it so as to conform to the contour of the closure and container at the region of the joint and at the same time sufficiently fuse the tape so as to seal it to itself. In order to impart this temperature to the film it is advantageous to heat the air in the tunnel to about 300° F. In general a temperature range of about 150° F. to 350° F. may be imparted to the thermoplastic films for sealing them about the closure joint, the specific temperatures used depending upon the characteristics of the composition of the film used. The sealing temperature may also vary depending upon the speed of the conveyor belt and the length of time the containers remain in the tunnel. These factors are adjusted so as to produce the desired characteristics of the closure seal with any given type of tape used.

If it is not desired to subject the entire container and its contents to heat, tunnel 39 is constructed so as to enclose only the upper portion of the container at the closure region.

A closure seal produced with a wax-rubber film is moisture-proof, and gas-proof so that the ingredients in the contents do not escape during storage or shipment. This particular wax-rubber film is also not affected by alcohol so that it is particularly adapted for sealing closures for containers having alcoholic contents. An advantage of this type of seal is that no tools or implements are needed to remove the seal as the seal is broken by simply twisting the closure. We find it advantageous to use a wax-rubber film made according to Abrams et al. Patent No. 2,054,114, September 15, 1936, as a grain is produced in the film in the length of the tape. This tape, upon being subjected to heat, shrinks in the direction of the grain. When it is applied about the closure joint so as to have the grain extend circumferentially about the closure the shrinking of the tape produces an excellent seal and causes the film to assume the contour at the joint region and to cling thereto.

The thermoplastic tapes afford good seals not only for closures of irregular contour but they are equally useful for containers having smooth or straight walled closures which are slipped over the opening of the closure. Suitable dyes and pigments may be added to the films used, thereby producing very attractive and ornamental effects.

We may, if desired, utilize preformed bands of thermoplastic material of suitable diameter so that they may be slipped over the closure joint and then subjected to heat to seal the closure. We may also use thermoplastic films reinforced with fibers or threads embedded therein which will be ruptured upon breaking the seal.

Other suitable methods and apparatus may be used for sealing container closures with thermoplastic films. The containers, for example, may be first heated by having the conveyor belt 32 pass through a heating tunnel. When metal closures are used they can be heated considerably so that when the tape is wrapped around the closure joint it will be sufficiently heated as soon as wrapped to weld the convolutions to each other to seal the closure without further heating. The tape can also be applied more conveniently when the containers are slightly warmed so as to facilitate adherence of the tape to the container when it is first applied. After the tape is applied the seal is completed by subjecting the container to sufficient heat to seal the closure joint.

We claim:

1. In combination, a container having a closure and a strip of sealing film surrounding and contacting said container and closure at their juncture region and with its ends in overlapping relation to each other, said strip being formed of flexible and heat shrinkable material having its grain extending in the direction of the length of said strip and comprising a wax-rubber composition which is autogenously sealable and is not sufficiently adherent to either the container or closure under normal conditions to be secured thereto by adhesion, said strip being conformed to the contour at the container and closure juncture region and being secured substantially solely by heat shrinking said strip in situ and autogenous sealing of its ends.

2. The method of sealing a container having a closure which comprises the steps of wrapping a strip of sealing film so as to surround and contact said container and closure at their juncture region and with its ends in overlapping relation to each other, said strip being formed of flexible and heat shrinkable material comprising a wax-rubber composition which is autogenously sealable and is not sufficiently adherent to either the container or closure under normal conditions to be secured thereto by adhesion and having its grain extending in the direction of its length, heating said wrapped strip to shrink and conform said strip to the contour of the container and closure juncture region, and simultaneously autogenously sealing its ends.

ALLEN ABRAMS.
GEORGE W. FORCEY.
CLINTON A. SHELDON.